(12) United States Patent
Sankuratripati et al.

(10) Patent No.: US 12,189,808 B1
(45) Date of Patent: Jan. 7, 2025

(54) PRIVACY PRESERVING ADVERTISING NETWORK

(71) Applicant: Snap Inc., Santa Monica, CA (US)

(72) Inventors: Subhash Sankuratripati, Playa Vista, CA (US); Sriram Keelveedhi, Marina Del Rey, CA (US)

(73) Assignee: SNAP INC., Santa Monica, CA (US)

( * ) Notice: Subject to any disclaimer, the term of this patent is extended or adjusted under 35 U.S.C. 154(b) by 415 days.

(21) Appl. No.: 16/913,221

(22) Filed: Jun. 26, 2020

Related U.S. Application Data

(60) Provisional application No. 62/868,728, filed on Jun. 28, 2019.

(51) Int. Cl.
| | |
|---|---|
| *G06F 21/62* | (2013.01) |
| *G06F 9/54* | (2006.01) |
| *G06F 16/23* | (2019.01) |
| *G06F 21/60* | (2013.01) |
| *G06Q 30/0251* | (2023.01) |
| *G06Q 50/26* | (2024.01) |
| *H04L 9/00* | (2022.01) |

(52) U.S. Cl.
CPC .......... *G06F 21/6245* (2013.01); *G06F 9/547* (2013.01); *G06F 16/2379* (2019.01); *G06F 21/602* (2013.01); *G06Q 30/0255* (2013.01); *G06Q 30/0269* (2013.01); *G06Q 50/265* (2013.01); *H04L 9/008* (2013.01); *G06Q 2220/00* (2013.01)

(58) Field of Classification Search
CPC .. G06F 21/6245; G06F 9/547; G06F 16/2379; G06F 21/602; G06Q 30/0255; G06Q 30/0269; G06Q 50/265; G06Q 2220/00; H04L 9/008
See application file for complete search history.

(56) References Cited

U.S. PATENT DOCUMENTS

| | | | |
|---|---|---|---|
| 2011/0167003 A1* | 7/2011 | Nice | G06Q 30/0271 705/50 |
| 2015/0332329 A1* | 11/2015 | Luo | H04W 4/21 705/14.58 |
| 2016/0182658 A1* | 6/2016 | Allinson | H04L 67/306 709/224 |

(Continued)

OTHER PUBLICATIONS

"Surprise!", [Online] Retrieved from the Internet: <URL: https://www.snap.com/en-US/news/post/surprise>, (Oct. 3, 2013), 1 pg.

(Continued)

*Primary Examiner* — John W Hayes
*Assistant Examiner* — Zehra Raza
(74) *Attorney, Agent, or Firm* — SCHWEGMAN LUNDBERG & WOESSNER, P.A.

(57) ABSTRACT

Systems and methods for performing operations comprising: storing, by one or more processors of a server, an encrypted profile for a user; receiving encrypted information from a first application that is installed on a user device associated with the user; updating the encrypted profile based on the received encrypted information without the server decrypting the profile and the information; selecting a first advertisement from a plurality of advertisements based on the updated encrypted profile; and transmitting the first advertisement to the user device.

18 Claims, 8 Drawing Sheets

(56) References Cited

U.S. PATENT DOCUMENTS

2017/0099133 A1* 4/2017 Gu .................. H04W 4/023
2020/0084483 A1* 3/2020 Brown .............. G06Q 20/3827

OTHER PUBLICATIONS

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

* cited by examiner

PRIVACY PRESERVING ADVERTISING NETWORK

CROSS-REFERENCE TO RELATED APPLICATION

The present disclosure claims the benefit of priority to U.S. Provisional Application No. 62/868,728, filed Jun. 28, 2019, which is incorporated by reference in its entirety.

TECHNICAL FIELD

The present disclosure relates generally to advertising.

BACKGROUND

Modern day service providers typically collect a variety of information from users to provide different services. The information that is collected can be analyzed to draw inferences about the users' interest. Such interests can then be used to target certain advertisements or content to the user. Because such information typically contains personal and sensitive information about the users, restrictions are often placed how such information is utilized and distributed.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
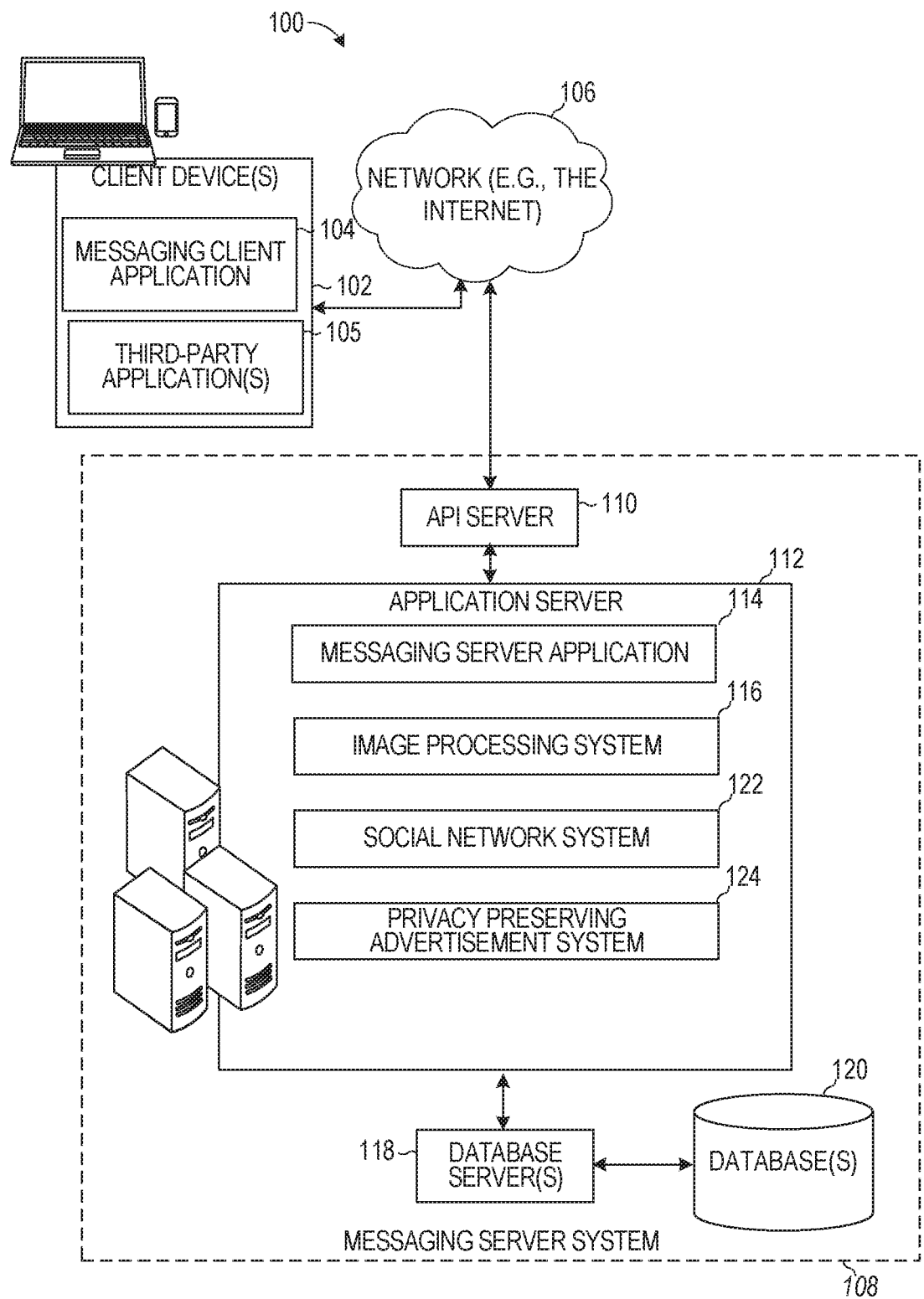
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Generating or selecting advertisements and content to present to users is typically performed based on various personal information about the user. This is known as targeted advertisements. To deliver the optimal advertisement or select the best advertisement to present to a given user, various advertisement criteria is considered. Such criteria includes demographic information (such as the user's age, gender, location, etc.), interests (e.g., whether the user is interested in sports or movies), and advertisement identifiers.

Typical systems target advertisements to users by bucketing users based on different advertisement criteria. The users are bucketed based on what the network knows or learns about the users based on data that is collected. In order to collect data from the users, consent is typically first obtained from the user. Then, data is collected from the user and a profile is generated for the user and is used to target certain advertisements and content to the user. Because explicit user consent is typically required in order to collect information about a user, such consent is obtained on a per application basis. Namely, each application that is installed on the user device has to obtain consent from the user and can then begin to target advertisements to the user.

There are many restrictions on how various applications utilize the data that is collected from users even after the user provides consent and whether such data can be shared between applications. As such, a first application that learns information about a user may not be allowed or capable of sharing that information with a second application. This limits the ability of the second application from targeting content and advertisements to the same user as the user of the first application. Also, users tend to avoid going through the trouble of navigating multiple interfaces and reading through various agreements to provide the explicit consent. This also limits the application's abilities to collect information from a large pool of users. As a result, sub-optimal selection of advertisements can often be made and provided to the users, reducing effectiveness of the advertisement targeting and adversely affecting some application functions. For example, presenting poorly selected advertisements to users wastes device resources as the impact and interest of the users in such advertisements is minimal or negative and users tend to view such advertisements as a nuisance rather than enjoying them. In addition, having each application individually and independently create profiles for its own users to target advertisements creates redundancies and wastes overall storage resources on servers and client devices.

The disclosed embodiments improve the efficiency of using the electronic device by intelligently targeting advertisements to users across multiple applications without necessarily obtaining consent explicitly from the users and without violating users' privacy rights. Particularly, the disclosed embodiments store an encrypted profile for a user device on a server and update this encrypted profile based on encrypted information obtained from a variety of applications that are installed on the user device. The server that stores the encrypted profile is incapable of decrypting or deciphering the content of the encrypted profile and operates on the profile without knowing the content of the encrypted profile. Namely, a particular application that is installed on the user device generates profile information representing particular user interactions with the applications. The profile information is encrypted by the application to prevent any other entity (even the application itself) from deciphering or decrypting the content of the profile information. The profile information, because of its encryption, can be shared with other servers and applications without explicit consent of the user. In this way, the profile information is provided to the server to update the encrypted profile that is stored on the server using homomorphic encryption techniques. Encrypted portions of the profile can then be utilized by the server to identify one or more advertisement types that are associated with the encrypted portions to select and profile to a given application. In some cases, private information retrieval techniques are utilized to make the selection of the advertisements based on encrypted profile information.

In this way, the disclosed embodiments, provide a technical and important improvement in the way user profiles are generated and how user information is obtained in a way that maintains a user's privacy to select advertisements and content. Also, advertisements that are of likely interest to the user are selected using the encrypted profiles (without ever decrypting any portions of the profile) to be delivered using one or more applications that are installed on the user device. Also, by creating an encrypted profile that is shared among various applications, redundancies in multiple parallel data storage and management architectures are reduced and storage device resources are more efficiently and effectively utilized without comprising user privacy.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and one or more third-party application(s) 105. Each messaging client application 104 is communicatively coupled to other instances of the messaging client application 104, the third-party application(s) 105, and a messaging server system 108 via a network 106 (e.g., the Internet).

Accordingly, each messaging client application 104 and third-party application(s) 105 is able to communicate and exchange data with another messaging client application 104 and third-party application(s) 105 and with the messaging server system 108 via the network 106. The data exchanged between messaging client applications 104, third-party application(s) 105, and the messaging server system 108 includes functions (e.g., commands to invoke functions) as well as payload data (e.g., text, audio, video, or other multimedia data).

The third-party application(s) 105 include various types of applications that are installed on the client device 102. Such applications include ride sharing applications, shopping applications, e-commerce applications, banking applications, email applications, social network applications, advertising applications, gaming application, and so forth. In some cases, one third-party application 105 cannot communicate with another third-party application 105. The third-party applications 105 are provided and are associated with an entity or organization different from that of the messaging client application 104 and the application server 112.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party applications 105 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The API server 110 provides a privacy preserving advertisement system 124 software development kit (SDK) that includes one or more APIs to the third-party applications 105. The third-party applications 105 can install the advertisement system SDK in order to utilize functions of the privacy preserving advertisement system 124. Specifically, the SDK can include an API function that can be called by a given application to encrypt a set of data that represents user interactions with the application that is installed on the client device 102. The SDK can include another API function that can be called by the given application to transmit the encrypted set of data to the privacy preserving advertisement system 124. The SDK can include another API function that can be called by the given application to obtain one or more advertisements or advertisement types based on an encrypted profile stored on the privacy preserving advertisement system 124. In this way, a first third-party application 105 can, via the API, provide data to update an encrypted profile stored on the privacy preserving advertisement system 124. A second third-party application 105 can, via the API, receive a selection of advertisements from the privacy preserving advertisement system 124 based on the encrypted data that the privacy preserving advertisement system 124 received from the first third-party application 105.

The application server 112 hosts a number of applications and subsystems, including a messaging server application 114, an image processing system 116, a social network system 122, and the privacy preserving advertisement system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the privacy preserving advertisement system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 112 is communicatively coupled to a database server 118, which facilitates access to a database 120 in which is stored data associated with messages processed by the messaging server application 114. Database 120 may be a third-party database. For example, the application server 112 may be associated with a first entity and the database 120 or a portion of the database 120 may be associated and hosted by a second different entity. In some implementations, database 120 stores advertisements or advertisement types that are associated with encrypted profile information.

Privacy preserving advertisement system 124 maintains encrypted device profiles for each user device 102. Privacy preserving advertisement system 124 may not include a decryption key necessary to decipher and read or interpret the contents of the encrypted device profiles. Privacy preserving advertisement system 124 utilizes one or more portions of the encrypted device profiles to obtain advertisements or advertisement types associated with such one or more portions of the encrypted device profiles. In such cases, the privacy preserving advertisement system 124 utilizes public information, such as a location or address of the client device 102, in combination with the encrypted device profile information to select the advertisements or advertisement types to serve or transmit to a requesting third-party application 105.

As an example, a first third-party application 105 may be configured to collect or track a certain set of first user interactions. Such interactions that are tracked may be determined based on the type of the first third-party application 105. For example, the first third-party application 105 may be a health or fitness application and may be configured to track how many other third-party applications 105 are simultaneously open while the health or fitness application is being used. Such information may be used to infer an age of a user. The health or fitness application may utilize a function call of the API provided by the privacy preserving advertisement system 124 to encrypt the number of simultaneously open applications. The health or fitness application may utilize a function call of the API to transmit the encrypted information to the privacy preserving advertisement system 124. Because the privacy preserving advertisement system 124 does not have a decryption key for the data encrypted by the health or fitness application, the user's privacy is maintained even though the encrypted data generated based on the user's actions is provided to another entity to which the user has not provided consent to the privacy preserving advertisement system 124 to collect such information.

Once the privacy preserving advertisement system 124 receives the encrypted information from the health or fitness application, the privacy preserving advertisement system 124 utilizes homomorphic encryption to update an encrypted profile associated with the device on which the health or fitness application is installed. For example, the privacy preserving advertisement system 124 retrieves an encrypted device profile based on an IP address of the client device 102 and then adds or combines the received encrypted information with the retrieved encrypted device profile without decrypting any of the information. Namely, the device profile is updated while maintaining the device profile in encrypted form.

In some embodiments, the first third-party application 105 may continue to collect or track the set of first user interactions and/or other user interactions continuously or periodically. The first third-party application 105 may continuously or periodically utilize a function call of the API provided by the privacy preserving advertisement system 124 to encrypt the set of first user interactions and/or other user interactions. The health or fitness application may utilize a function call of the API to transmit the encrypted information to the privacy preserving advertisement system 124 to update the encrypted profile that is stored on the privacy preserving advertisement system 124.

Homomorphic encryption is a form of encryption that allows computation on ciphertexts, generating an encrypted result which, when decrypted, matches the result of the operations as if they had been performed on the plaintext.

Homomorphic encryption can be used for privacy-preserving outsourced storage and computation. This allows data to be encrypted and outsourced to commercial cloud environments for processing, all while encrypted. Homomorphic encryption is a form of encryption with an additional evaluation capability for computing over encrypted data without access to the secret key. The result of such a computation remains encrypted. Homomorphic encryption can be viewed as an extension of either symmetric-key or public-key cryptography. Homomorphic refers to homomorphism in algebra; the encryption and decryption functions can be thought as homomorphisms between plaintext and ciphertext spaces.

Homomorphic encryption includes multiple types of encryption schemes that can perform different classes of computations over encrypted data. Some common types of homomorphic encryption are partially homomorphic, somewhat homomorphic, leveled fully homomorphic, and fully homomorphic encryption. The computations are represented as either Boolean or arithmetic circuits. Partially homomorphic encryption encompasses schemes that support the evaluation of circuits consisting of only one type of gate, e.g., addition or multiplication. Somewhat homomorphic encryption schemes can evaluate two types of gates, but only for a subset of circuits. Leveled fully homomorphic encryption supports the evaluation of arbitrary circuits of bounded (pre-determined) depth. Fully homomorphic encryption (FHE) allows the evaluation of arbitrary circuits of unbounded depth, and is the strongest notion of homomorphic encryption.

A second third-party application 105 may be configured to collect or track a certain set of second user interactions. Such interactions that are tracked may be determined based on the type of the second third-party application 105. For example, the second third-party application 105 may be a sports application and may be configured to track how many other third-party applications 105 are simultaneously open while the sports application is being used and may weigh such information more heavily if the user is associated with one set of demographics (e.g., location, age, etc.) rather than another set of demographics. Such information may be used to infer additional sets of demographics of a user. The sports application may utilize a function call of the API provided by the privacy preserving advertisement system 124 to encrypt the information and may utilize a function call of the API to transmit the encrypted information to the privacy preserving advertisement system 124.

Once the privacy preserving advertisement system 124 receives the encrypted information from the sports application, the privacy preserving advertisement system 124 utilizes homomorphic encryption to update an encrypted profile associated with the device on which the sports application is installed. For example, the privacy preserving advertisement system 124 retrieves an encrypted device profile based on an IP address of the client device 102 and then adds or combines the received encrypted information with the retrieved encrypted device profile without decrypting any of the information. In this way, the profile maintained by the privacy preserving advertisement system 124 remains in encrypted form and includes encrypted information representing user interactions across the first and the second third-party applications 105.

A third third-party application 105 (or the first or second third-party applications 105) may utilize the API to request an advertisement from the privacy preserving advertisement system 124. In response to receiving this request, the privacy preserving advertisement system 124 retrieves the device profile of the client device 102 and using the encrypted information in the profile, the privacy preserving advertisement system 124 identifies one or more advertisements or advertisement types that are associated with the encrypted profile information. The identified advertisements or advertisement types are utilized to select a particular advertisement to provide back to the requesting third-party application 105. Because the advertisements are identified using encrypted information without ever decrypting the information or knowing what the encrypted information represents about a given user, the advertisements are selected without compromising the user's privacy. Meanwhile advertisements that are of likely interest to the user are selected using the encrypted information that is likely associated with advertisement types that are of interest to the user.

In some embodiments, rather than the privacy preserving advertisement system 124 selecting and retrieving advertisements for transmission back to a requesting third-party application 105, the privacy preserving advertisement system 124 provides the encrypted profile to the requesting third-party application 105. The third-party application 105 may process the profile in a similar way to identify and select a given advertisement using the encrypted profile information without decrypting the content of the profile. In some cases, the third-party application 105 may be capable of decrypting certain portions of the encrypted profile and may utilize those decrypted portions together with other encrypted portions to identify and select advertisements. For example, a first portion of the encrypted device profile may represent a user location. The first portion may be decrypted by the third-party application while a second portion of the device profile that represents age of a user remains encrypted. The third-party application 105 may access a first set of advertisements associated with the user location that is decrypted and then within that set may use the encrypted second portion of the device profile to select an advertisement that is of likely interest to the user.

Figure 2:
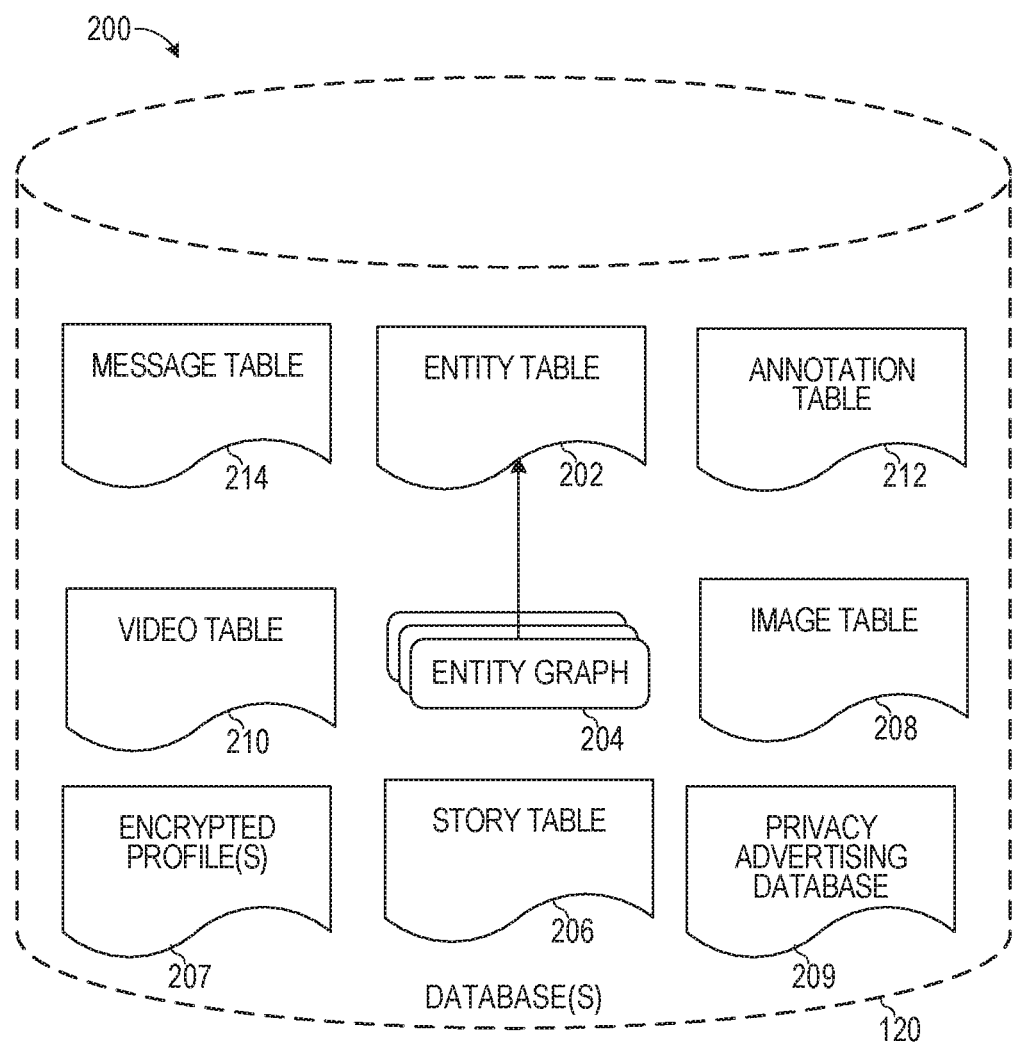
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Encrypted profile(s) 207 stores previously collected encrypted data about a plurality of devices associated with the application server 112. Such data includes any encrypted personal information supplied by the applications installed by respective user devices and encrypted interaction data about the users. The encrypted interactions can represent at least one of number of other applications opened concurrently with the first application, number of times in a given period that the first application is accessed by a user of the client device, a type of the first application, or one or more options selected by a user of the first application. Each device may be assigned a unique ID (e.g., based on an IP address or MAC address of the device) and a specific device profile may be generated for that device and stored as an encrypted profile in encrypted profile(s) 207.

Figure 5:
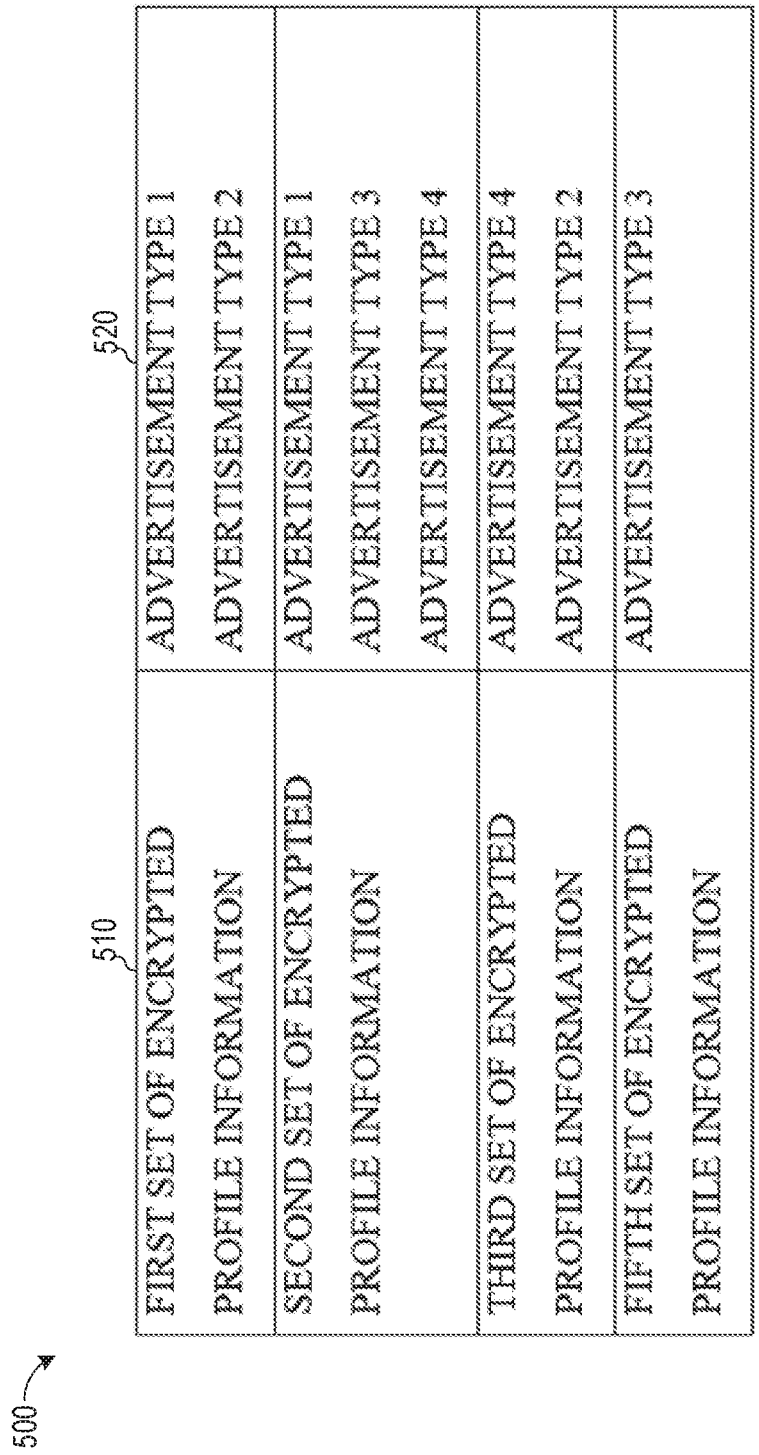
FIG. 5 is a diagram showing an example private information retrieval based advertisement database, according to example embodiments.

Privacy advertising database 209 stores a database that associates different encrypted device profile portions with one or more advertisements or advertisement types. An illustrative database portion 500 is shown in FIG. 5. As an example, an encrypted device profile portion fields 510 may be provided in which one or more sets of encrypted device profile information is stored. Associated with each encrypted device profile portion fields 510 is an advertisement field 520. The advertisement field 520 includes one or more advertisement identifiers, advertisement types or advertisements associated with the given one or more encrypted device profile information of field 510. The privacy preserving advertisement system 124 accesses a particular encrypted device profile stored in encrypted profile(s) 207 and searches the privacy advertising database 209 for portions stored in fields 510 that match portions of the retrieved profile. Once a portion is found to match, the corresponding advertisement, advertisement type, or advertisement identifier is obtained from the advertisement field 520 and used to provide an advertisement or plurality of advertisements to a requesting third-party application 105. In some embodiments, the sets of encrypted device profile information change and are dynamically adapted over time or based on devices or device types.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
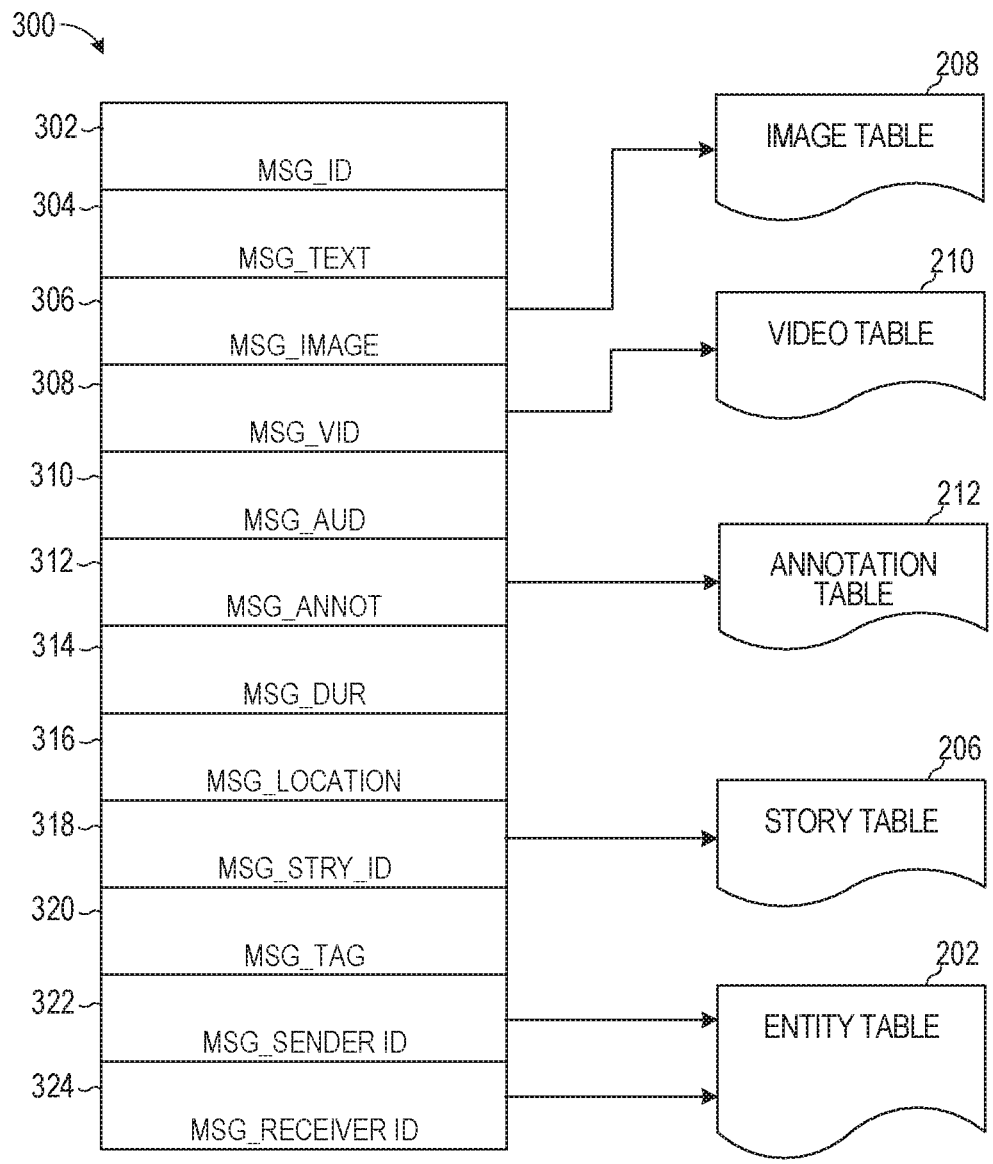
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
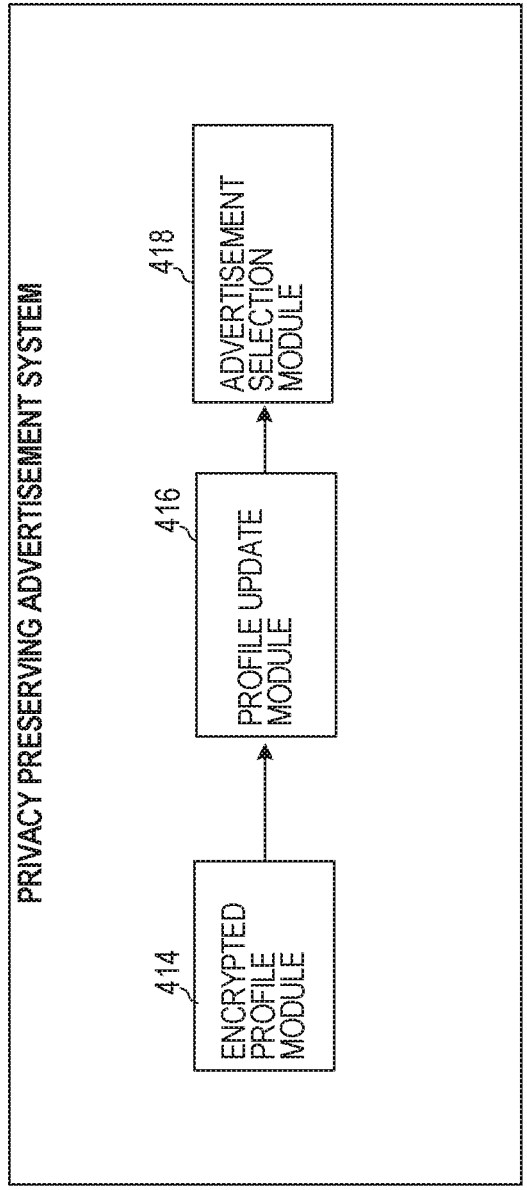
FIG. 4 is a block diagram showing an example privacy preserving advertisement system, according to example embodiments.

FIG. 4 is a block diagram showing an example privacy preserving advertisement system 124, according to example embodiments. Privacy preserving advertisement system 124 includes an encrypted profile module 414, profile update module 416, and an advertisement selection module 418.

Encrypted profile module 414 may generate an encrypted profile for each client device 102. Specifically, the encrypted profile module 414 may receive encrypted information from a given third-party application 105 (or messaging client application 104) that is installed on a given client device 102. The encrypted profile module 414 may obtain a blank template of a device profile and may aggregate the received encrypted information into the template to generate the encrypted device profile. The encrypted device profile may then be stored in associated with a unique identifier of the client device 102 in encrypted profile(s) 207.

The encrypted device profile module 414 may respond to API function calls by the third-party application 105 to encrypt interaction data of the third-party application 105. In response, the encrypted device profile module 414 may provide a public encryption key or private encryption key to the requesting third-party application 105. The same key may not be usable to decrypt the contents of the encrypted information. The third-party application 105 may encrypt the interaction data using the supplied key from the encrypted device profile module 414. The third-party application 105 may then provide to the encrypted device profile module 414 the encrypted interaction data.

The profile update module 416 may respond to an API function call by the third-party application 105 to update the encrypted device profile for the device on which the third-party application 105 is installed. The profile update module 416 may communicate with the encrypted device profile module 414 to obtain the encrypted device profile associated with the device and the encrypted information representing the interaction data of the third-party application 105. The profile update module 416 may apply homomorphic encryption to add or combine the received encrypted profile information with the retrieved encrypted profile of the device. The profile update module 416 may similarly respond to other requests from other third-party applications 105 installed on the same device to update the same profile that is associated with the particular device when encrypted interaction data is received from the other third-party applications 105. In this way, the server remains agnostic to the decrypted contents of the encrypted profile.

The advertisement selection module 418 may respond to an API function call from a particular third-party application 105 to obtain an advertisement. The advertisement selection module 418 may retrieve an encrypted device profile associated with the device identifier of the device on which the particular third-party application 105 is installed. The particular third-party application 105 may or may not be the same third-party application 105 that caused the device profile to be updated or generated and which provided encrypted information representing interaction data for a user.

The advertisement selection module 418 may provide the encrypted device profile back to the requesting particular third-party application 105. In such cases, the particular third-party application 105 may utilize the encrypted device profile to identify and select an advertisement. In some embodiments, the third-party application 105 may select an advertisement from a pool of advertisements stored locally on the user device each of which is associated with one or more portions of the encrypted device profile. The advertisements may be associated with encrypted and/or decrypted portions of the device profile. In some cases, the third-party application 105 can decrypt a first set of portions of the encrypted profile to make a first selection from the pool of advertisements and then utilize an encrypted portion without decrypting the encrypted portion to identify and select an advertisement from the first selection that is made.

In some embodiments, the advertisement selection module 418 provides some or all of the encrypted portions of the device profile to an advertisement server together with publicly available information about the device associated with the encrypted device profile (e.g., the location and/or IP address of the device). The advertisement server searches the stored encrypted device profile portions to identify one or more portions that correspond to or match the encrypted portions of the device profile. The identified one or more portions are used to retrieve the associated advertisements, advertisement identifiers and/or advertisement types.

In some cases, a first encrypted portion of the device profile may correspond to a first set of encrypted device profile information that is associated with first and second advertisement types. A second encrypted portion of the device profile may correspond to a second set of encrypted device profile information that is associated with second and third advertisement types. Because the second advertisement type are associated with both portions of the encrypted device profile that correspond to or match the first and second sets of encrypted device profile information, the second advertisement type may be selected as the likely candidate for targeting advertisements to the user device. The advertisement selection module 418 may retrieve one or more advertisements associated with the second advertisement type and provide the retrieved advertisements to the particular third-party application 105 that requested the advertisement. In this way, the third-party application 105 can receive an advertisement of interest to a user based on user interaction information that is derived and encrypted by a different third-party application 105 without obtaining consent from the user or revealing the contents of the encrypted interaction information.

In some embodiments, the advertisement selection module 418 may return or transmit to the requesting third-party application 105 the identified second advertisement type instead of, or in addition to, the retrieved advertisement associated with the advertisement type. In such circumstances, in response to receiving the second advertisement type from the advertisement selection module 418, the third-party application 105 may retrieve or select an advertisement from a plurality (or a pool) of advertisements that are each associated with the second advertisement type. In this way, the third-party application 105 may locally store a set of proprietary advertisements that are categorized by type. The advertisement selection module 418 simply informs the third-party application 105 of the type of advertisement that is of likely interest to the user as determined based on the encrypted device profile information without decrypting the device profile information. Then the third-party application 105 can select from its own pool or collection of advertisements the advertisement that is of the type that is determined by the advertisement selection module 418 to be of likely interest to the user.

In some cases, the pool of advertisements is stored on a remote server associated with the third-party application 105 and can be provided the second advertisement type by the third-party application 105 to select and provide the one or more advertisements that are of the second advertisement type back to the third-party application 105. In this way, the third-party application 105 can identify and select an advertisement of interest to a user from a pool of local or remote advertisements based on user interaction information that is derived and encrypted by a different third-party application 105 without obtaining consent from the user or revealing the contents of the encrypted interaction information.

Figure 6:
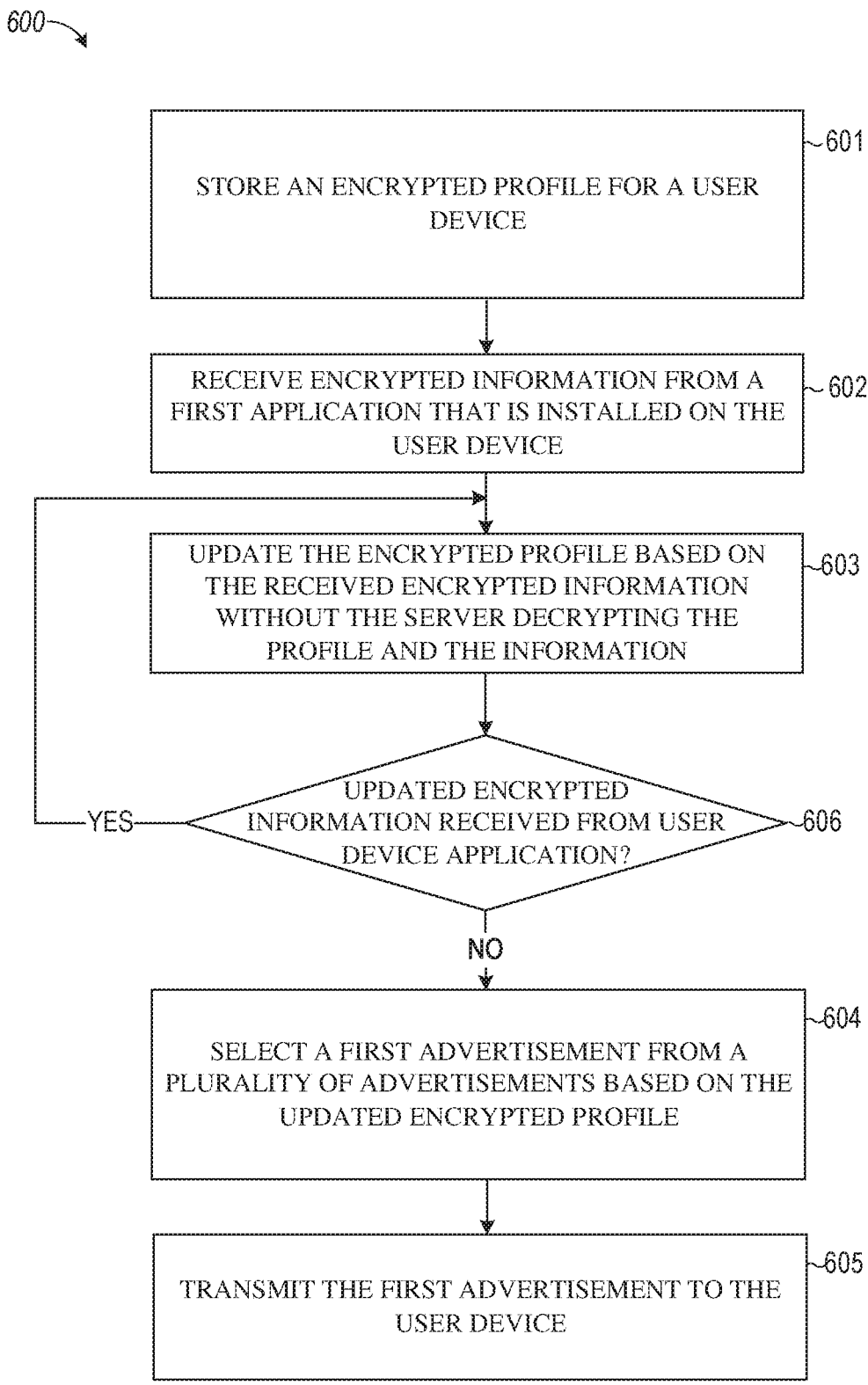
FIG. 6 is a flowchart illustrating example operations of the privacy preserving advertisement system, according to example embodiments.

FIG. 6 is a flowchart illustrating example operations of the privacy preserving advertisement system 124 in performing process 600, according to example embodiments. The process 600 may be embodied in computer-readable instructions for execution by one or more processors such that the operations of the process 600 may be performed in part or in whole by the functional components of the messaging server system 108 and/or third-party application(s) 105; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted.

At operation 601, the privacy preserving advertisement system 124 stores an encrypted profile for a user device.

At operation 602, the privacy preserving advertisement system 124 receives encrypted information from a first application that is installed on the user device.

At operation 603, the privacy preserving advertisement system 124 updates the encrypted profile based on the received encrypted information without the server decrypting the profile and the information and re-encrypting the profile and the information.

Following updating the encrypted profile, the privacy preserving advertisement system 124 proceeds to operation 606. At operation 606, the privacy preserving advertisement system 124 determines whether updated encrypted information is received from a user device application (e.g., the first application that is installed on the user device and/or a second application that is installed on the user device). In response to determining, that updated encrypted information has been received, the privacy preserving advertisement system 124 proceeds to operation 603, otherwise the privacy preserving advertisement system 124 proceeds to operation 604. As an example, the first third-party application 105, after transmitting the encrypted information to the privacy preserving advertisement system 124 which is received at operation 602, may continue to collect or track the set of first user interactions and/or other user interactions continuously or periodically to generate an updated set of user interactions and may continuously or periodically utilize a function call of the API provided by the privacy preserving advertisement system 124 to encrypt the updated set of user interactions and/or other user interactions. The health or fitness application may utilize a function call of the API to transmit the updated encrypted information to the privacy preserving advertisement system 124 which is received at operation 606 and is used to directly update the encrypted profile that is stored on the privacy preserving advertisement system 124 at operation 603 without decrypting and re-encrypting the profile.

As another example, the privacy preserving advertisement system 124 may receive encrypted information at operation 606 from a second application that is installed on the user device. Specifically, the second third-party application 105 may be a sports application and may be configured to track how many other third-party applications 105 are simultaneously open while the sports application is being used and may weigh such information more heavily if the user is associated with one set of demographics rather than another set of demographics. Such information may be used to infer other sets of demographics of a user. The sports application may utilize a function call of the API provided by the privacy preserving advertisement system 124 to encrypt the information and may utilize a function call of the API to transmit the encrypted information to the privacy preserving advertisement system 124. The privacy preserving advertisement system 124 receives the encrypted information from the sports application at operation 606 and utilizes homomorphic encryption to directly update an encrypted profile associated with the device on which the sports application is installed at operation 603 without decrypting and re-encrypting the profile. For example, the privacy preserving advertisement system 124 retrieves an encrypted device profile based on an IP address of the client device 102 and then adds or combines the received encrypted information with the retrieved encrypted device profile without decrypting any of the information and re-encrypting the information. In this way, the profile maintained by the privacy preserving advertisement system 124 remains in encrypted form and the privacy preserving advertisement system 124 is agnostic to its contents and includes encrypted information representing user interactions across the first and the second third-party applications 105.

At operation 604, the privacy preserving advertisement system 124 selects a first advertisement from a plurality of advertisements based on the updated encrypted profile.

At operation 605, the privacy preserving advertisement system 124 transmits the first advertisement to the user device.

Figure 7:
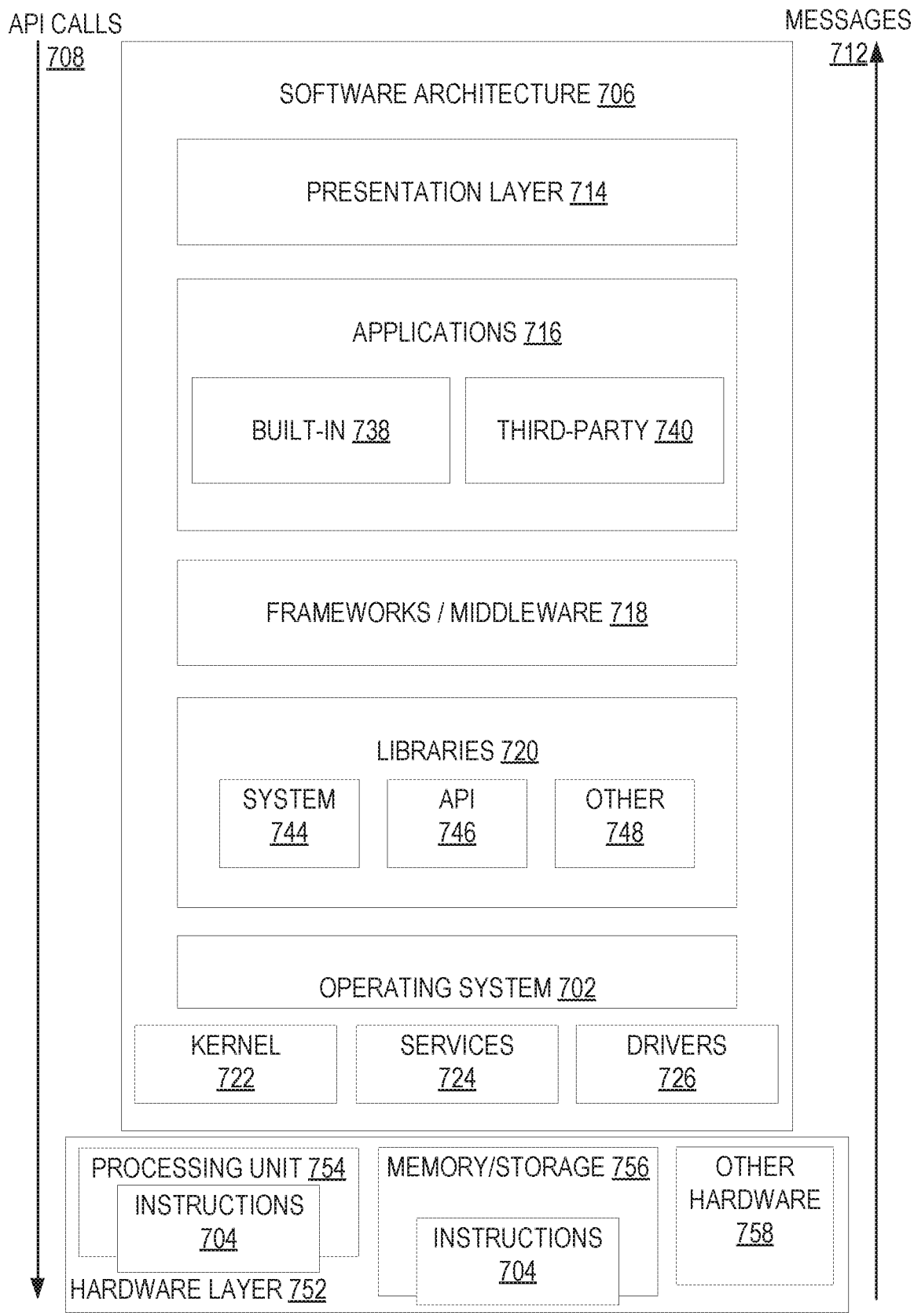
FIG. 7 is a block diagram illustrating a representative software architecture, which may be used in conjunction with various hardware architectures herein described, according to example embodiments.

FIG. 7 is a block diagram illustrating an example software architecture 706, which may be used in conjunction with various hardware architectures herein described. FIG. 7 is a non-limiting example of a software architecture and it will be appreciated that many other architectures may be implemented to facilitate the functionality described herein. The software architecture 706 may execute on hardware such as machine 800 of FIG. 8 that includes, among other things, processors 804, memory 814, and input/output (I/O) components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules memory/storage 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724 and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphic UI (GUI) functions, high-level resource management, high-level location services, and so forth. The frameworks/middleware 718 may provide a broad spectrum of other APIs that may be utilized by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built-in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
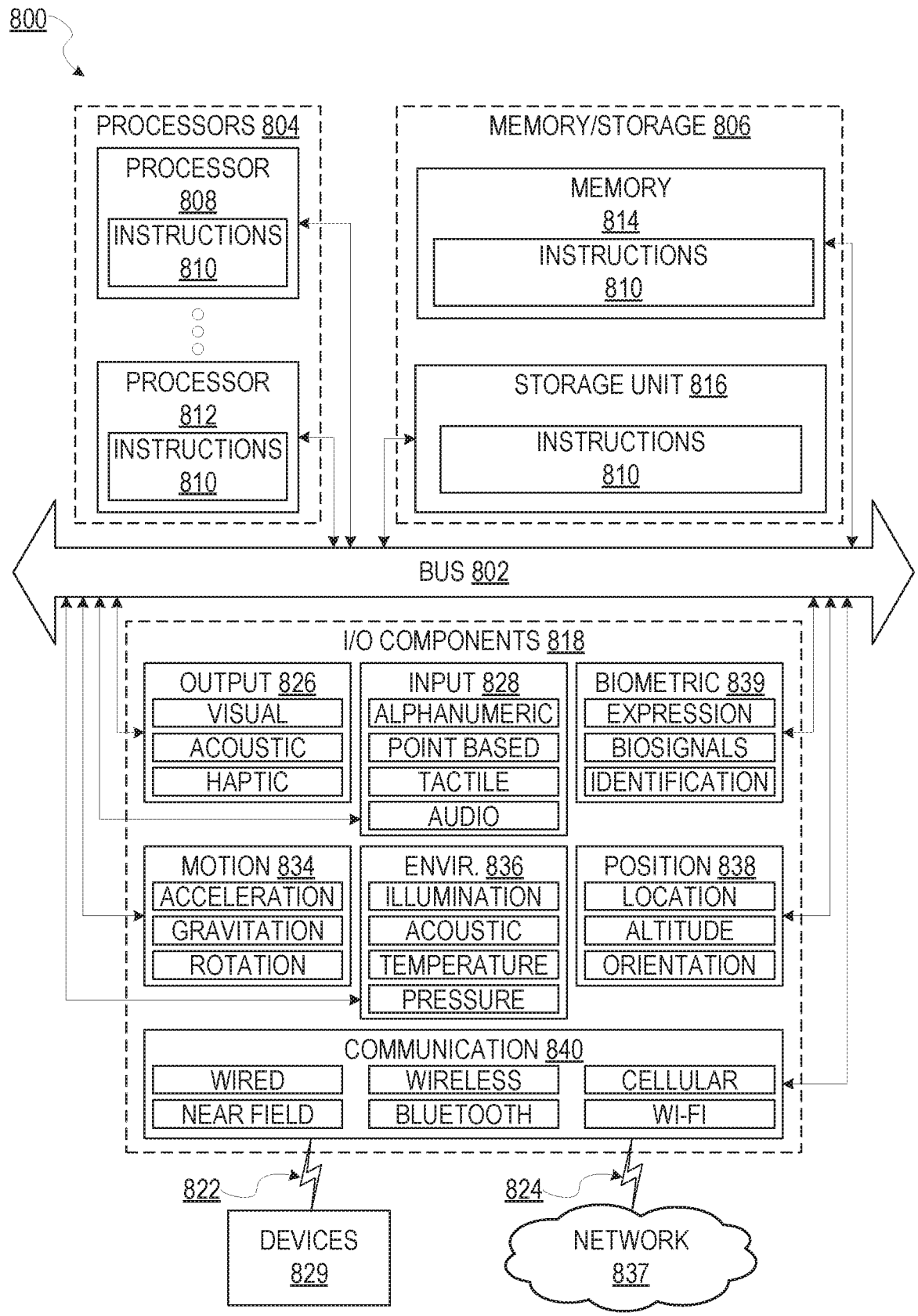
FIG. 8 is a block diagram illustrating components of a machine able to read instructions from a machine-readable medium (e.g., a machine-readable storage medium) and perform any one or more of the methodologies discussed herein, according to example embodiments.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. In an example embodiment, the processors 804 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 808 and a processor 812 that may execute the instructions 810. The term "processor" is intended to include multi-core processors 804 that may comprise two or more independent processors (sometimes referred to as "cores") that may execute instructions contemporaneously. Although FIG. 8 shows multiple processors 804, the machine 800 may include a single processor with a single core, a single processor with multiple cores (e.g., a multi-core processor), multiple processors with a single core, multiple processors with multiple cores, or any combination thereof.

The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 839, motion components 834, environmental components 836, or position components 838 among a wide array of other components. For example, the biometric components 839 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 837 or devices 829 via coupling 824 and coupling 822, respectively. For example, the communication components 840 may include a network interface component or other suitable device to interface with the network 837. In further examples, communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 829 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geolocation, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
storing, by one or more processors of a server, an encrypted profile for a user;
receiving, by the one or more processors of the server, a first set of encrypted information from a first application that is installed on a user device associated with the user and a second set of encrypted information from a second application that is installed on the user device;
in response to the server receiving the first set of encrypted information from the first application and the second set of encrypted information from the second application, updating, by the one or more processors of the server, the encrypted profile based on the first and second sets of encrypted information received respectively from the first and second applications without the server decrypting the profile;
generating a database that stores sets of encrypted profile information associated with one or more advertisements, a first set of encrypted profile information corresponding to a first type and a second type of the one or more advertisements, a second set of the encrypted profile information corresponding to the second type and a third type of the one or more advertisements;
receiving a request for an advertisement from a third application that is installed on the user device and is associated with the user;
in response to receiving the request for the advertisement from the third application:
matching portions of the encrypted profile to the stored sets of the encrypted profile information, the matching comprising:
determining that a first portion of the encrypted profile corresponds to the first set of the encrypted profile information; and
determining that a second portion of the encrypted profile corresponds to the second set of the encrypted profile information;
selecting, as a first advertisement, a given advertisement stored in the database that is associated with the second type of advertisement, wherein the second type of advertisement is associated with both the first and the second portion of the encrypted profile; and
transmitting, by the one or more processors of the server, the first advertisement to the third application that is installed on the user device, the third application selecting a second advertisement by:
decrypting a first portion of the encrypted profile;
obtaining a first set of advertisements associated with the decrypted first portion of the encrypted profile; and
searching the first set of advertisements for the second advertisement based on a second portion of the encrypted profile without decrypting the second portion of the encrypted profile.

2. The method of claim 1, wherein the server does not have access to a decryption key for decryption the profile and the information and is incapable of decrypting the encrypted profile and the information.

3. The method of claim 1, wherein the server employs a private information retrieval process to select the first advertisement.

4. The method of claim 1, wherein the first application communicates the encrypted information via an advertising application programming interface (API) of the server.

5. The method of claim 1, wherein the first advertisement is further selected based on an address of the user device.

6. The method of claim 5, wherein the server communicates the address and the encrypted profile to an advertising server for selecting the first advertisement.

7. The method of claim 1 further comprising:
receiving, by the one or more processors of the server, additional encrypted information from at least one of the first application and the second application that is installed on the user device; and
updating, by the one or more processors of the server, the encrypted profile based on the received additional encrypted information without the server decrypting the profile and the information.

8. The method of claim 1 further comprising:
detecting an interaction with the first application; and
generating, using an application programing interface (API) of the server, the encrypted information based on the detected interaction.

9. The method of claim 8, wherein the interaction represents at least one of number of other applications opened concurrently with the first application, number of times in a given period that the first application is accessed by a user of a client device, a type of the first application, or one or more options selected by a user of the first application.

10. The method of claim 1, wherein updating the encrypted profile comprises adding or combining the received encrypted information with the encrypted profile based on homomorphic encryption, while the encrypted information and the encrypted profile remain encrypted.

11. The method of claim 1, further comprising transmitting the encrypted profile to the third application, the third application selecting one or more advertisements based on the encrypted profile without decrypting content of the encrypted profile.

12. A system comprising:
a user device comprising a user device processor and a user device memory, the user device memory storing a third application;
at least one processor on a server configured to perform operations comprising:
storing an encrypted profile for a user;
receiving a first set of encrypted information from a first application that is installed on the user device associated with the user and a second set of encrypted information from a second application that is installed on the user device;
in response to the server receiving the first set of encrypted information from the first application and the second set of encrypted information from the second application, updating the encrypted profile based on the first and second sets of encrypted information received respectively from the first and second applications without the server decrypting the profile;
receiving a request for an advertisement from h third application that is installed on the user device and is associated with the user;
generating a database that stores sets of encrypted profile information associated with one or more advertisements, a first set of encrypted profile information corresponding to a first type and a second type of the one or more advertisements, a second set of the encrypted profile information corresponding to the second type and a third type of the one or more advertisements;
in response to receiving the request for the advertisement from the third application:

matching portions of the encrypted profile to the stored sets of the encrypted profile information, the matching comprising:
  determining that a first portion of the encrypted profile corresponds to the first set of the encrypted profile information; and
  determining that a second portion of the encrypted profile corresponds to the second set of the encrypted profile information;
selecting, as a first advertisement, a given advertisement stored in the database that is associated with the second type of advertisement, wherein the second type of advertisement is associated with both the first and the second portion of the encrypted profile; and
transmitting the first advertisement to the third application that is installed on the user device,
wherein the user device processor is configured to execute the third application to perform operations of:
selecting a second advertisement by:
  decrypting a first portion of the encrypted profile;
  obtaining a first set of advertisements associated with the decrypted first portion of the encrypted profile; and
  searching the first set of advertisements for the second advertisement based on a second portion of the encrypted profile without decrypting the second portion of the encrypted profile.

13. The system of claim 12, wherein the first application comprises a health or fitness application that generates a number representing how many other applications are simultaneously open while the health or fitness application is being used.

14. The system of claim 13, wherein the first application is configured to:
  perform a first function call to the server to encrypt the number representing how many other applications are simultaneously open while the health or fitness application is being used; and
  perform a second function call to the server to transmit, as the first set of encrypted information, the encrypted number representing how many other applications are simultaneously open while the health or fitness application is being used to the server.

15. A system comprising:
a first non-transitory machine-readable storage medium that includes first instructions that, when executed by one or more processors of a server, cause the server to perform operations comprising:
  storing an encrypted profile for a user;
  receiving a first set of encrypted information from a first application that is installed on a user device associated with the user and a second set of encrypted information from a second application that is installed on the user device;
  in response to the server receiving the first set of encrypted information from the first application and the second set of encrypted information from the second application, updating the encrypted profile based on the first and second sets of encrypted information received respectively from the first and second applications without the server decrypting the profile;
  generating a database that stores sets of encrypted profile information associated with one or more advertisements, a first set of encrypted profile information corresponding to a first type and a second type of the one or more advertisements, a second set of the encrypted profile information corresponding to the second type and a third type of the one or more advertisements;
  receiving a request for an advertisement from a third application that is installed on the user device and is associated with the user;
  in response to receiving the request for the advertisement from the third application:
    matching portions of the encrypted profile to the stored sets of the encrypted profile information, the matching comprising:
      determining that a first portion of the encrypted profile corresponds to the first set of the encrypted profile information; and
      determining that a second portion of the encrypted profile corresponds to the second set of the encrypted profile information;
    selecting, as a first advertisement, a given advertisement stored in the database that is associated with the second type of advertisement, wherein the second type of advertisement is associated with both the first and the second portion of the encrypted profile; and
    transmitting the first advertisement to the third application that is installed on the user device;
the system further comprising a second non-transitory machine-readable medium that includes second instructions that, when executed by one or more processors of the user device, cause the user device to perform operations comprising:
  selecting, by the third application, a second advertisement by:
    decrypting a first portion of the encrypted profile:
    obtaining a first set of advertisements associated with the decrypted first portion of the encrypted profile; and
    searching the first set of advertisements for the second advertisement based on a second portion of the encrypted profile without decrypting the second portion of the encrypted profile.

16. The system of claim 14, wherein the operations comprise inferring a demographic of the user based on the encrypted number representing how many other applications are simultaneously open while the health or fitness application is being used.

17. A method comprising:
  storing, by one or more processors of a server, an encrypted profile for a user;
  receiving, by the one or mom processors of the server, a first set of encrypted information from a first application that is installed on a user device associated with the user and a second set of encrypted information from a second application that is installed on the user device;
  updating, by the one or more processors of the server, the encrypted profile based on the received first and second sets of encrypted information directly such that the server is agnostic to decrypted contents of the encrypted profile;
  generating, by the one or more processors of the server, a database that stores sets of encrypted profile information associated with one or more advertisements, a first set of encrypted profile information corresponding to a first type and a second type of the one or more advertisements, a second set of the encrypted profile information corresponding to the second type and a third type of the one or more advertisements;

receiving a request for an advertisement from a third application that is installed on the user device and is associated with the user;

in response to receiving the request for the advertisement from the third application:

matching portions of the encrypted profile to the stored sets of the encrypted profile information, the matching comprising:

determining that a first portion of the encrypted profile corresponds to the first set of the encrypted profile information; and determining that a second portion of the encrypted profile corresponds to the second set of the encrypted profile information;

selecting, as a first advertisement, a given advertisement stored in the database that is associated with the second type of advertisement, wherein the second type of advertisement is associated with both the first and the second portion of the encrypted profile; and transmitting, by the one or more processors of the server, the first advertisement to the third application that is installed on the user device, the third application selecting a second advertisement by:

decrypting a first portion of the encrypted profile;

obtaining a first set of advertisements associated with the decrypted first portion of the encrypted profile; and searching the first set of advertisements for the second advertisement based on a second portion of the encrypted profile without decrypting the second portion of the encrypted profile.

18. The system of claim 14, wherein the second application comprises a sports application that generates a second number representing how many other applications are simultaneously open while the sports application is being used, the second application configured to:

perform a third function call to the server to encrypt the second number representing how many other applications are simultaneously open while the sports application is being used; and perform a fourth function call to the server to transmit, as the second set of encrypted information, the encrypted second number representing how many other applications are simultaneously open while the sports application is being used to the server.

* * * * *